US010129769B2

(12) United States Patent
Logan et al.

(10) Patent No.: US 10,129,769 B2
(45) Date of Patent: Nov. 13, 2018

(54) ADAPTIVE PEER OVERLOAD CONTROL IN MOBILE NETWORKS

(71) Applicant: Affirmed Networks, Inc., Acton, MA (US)

(72) Inventors: James L. Logan, Acton, MA (US); Mark Libby, Groton, MA (US); Narsi Veldanda, Northboro, MA (US); Rajesh Palakkal, Groton, MA (US); Siddharth Bhojnagarwala, Concord, MA (US)

(73) Assignee: AFFIRMED NETWORKS, INC., Acton, MA (US)

( * ) Notice: Subject to any disclaimer, the term of this patent is extended or adjusted under 35 U.S.C. 154(b) by 0 days.

(21) Appl. No.: 15/389,588

(22) Filed: Dec. 23, 2016

(65) Prior Publication Data
US 2017/0195898 A1    Jul. 6, 2017

Related U.S. Application Data

(60) Provisional application No. 62/273,734, filed on Dec. 31, 2015.

(51) Int. Cl.
*H04W 4/00*    (2018.01)
*H04W 24/02*   (2009.01)
(Continued)

(52) U.S. Cl.
CPC ........... *H04W 24/02* (2013.01); *H04L 47/225* (2013.01); *H04W 28/021* (2013.01)

(58) Field of Classification Search
None
See application file for complete search history.

(56) References Cited

U.S. PATENT DOCUMENTS 4,872,157 A    10/1989   Hemmady et al.
4,872,159 A    10/1989   Hemmady et al.
(Continued)

FOREIGN PATENT DOCUMENTS

CN    101188520 A    5/2008
CN    102118294 A    7/2011
(Continued)

OTHER PUBLICATIONS

International Search Report and Written Opinion issued by the U.S. Patent and Trademark Office as International Searching Authority, issued in PCT/US16/68485, dated Mar. 10, 2017 (7 pages).

*Primary Examiner* — Anh Vu H Ly
(74) *Attorney, Agent, or Firm* — Wilmer Cutler Pickering Hale and Dorr LLP

(57) ABSTRACT

Systems and methods for adaptively adjusting a transaction rate at a mobile network node. A first mobile network client node receives configuration parameters including an initial transaction rate, a step up rate, a step down rate, a minimum rate, a maximum rate, an evaluation time period, a step up response time threshold, a step down response time threshold, a step up threshold percentage of responses, and a step down threshold percentage of responses. Responses associated with communications with the server node are received during a first time period associated with the evaluation time period. A percentage of the received responses being less than the step up response time threshold and a percentage of the received responses being greater than the step down response time threshold are determined. An initial transaction rate is increased by the step up rate or decreased by the step down rate based on the determined percentages.

20 Claims, 5 Drawing Sheets

(51) Int. Cl.
  *H04L 12/815*   (2013.01)
  *H04W 28/02*   (2009.01)

(56) References Cited

U.S. PATENT DOCUMENTS

| | | |
|---|---|---|
| 4,872,160 A | 10/1989 | Hemmady et al. |
| 4,875,206 A | 10/1989 | Nichols et al. |
| 4,894,824 A | 1/1990 | Hemmady et al. |
| 4,896,319 A | 1/1990 | Lidinsky et al. |
| 4,897,874 A | 1/1990 | Lidinsky et al. |
| 4,899,333 A | 2/1990 | Roediger |
| 4,922,486 A | 5/1990 | Lidinsky et al. |
| 4,942,574 A | 7/1990 | Zelle |
| 4,958,341 A | 9/1990 | Hemmady et al. |
| 4,977,582 A | 12/1990 | Nichols et al. |
| 5,367,523 A | 11/1994 | Chang et al. |
| 7,483,995 B2 | 1/2009 | Abhishek et al. |
| 7,596,369 B2 | 9/2009 | Alperin et al. |
| 8,085,808 B2 | 12/2011 | Brusca et al. |
| 8,102,813 B2 | 1/2012 | Abhishek et al. |
| 8,364,633 B2 | 1/2013 | Aahlad et al. |
| 8,515,488 B2 | 8/2013 | Hillier et al. |
| 8,799,512 B2 | 8/2014 | Alperin et al. |
| 2003/0208609 A1 | 11/2003 | Brusca |
| 2005/0237932 A1 | 10/2005 | Liu |
| 2006/0183469 A1 | 8/2006 | Gadson |
| 2008/0139133 A1 | 6/2008 | Usuda et al. |
| 2008/0140726 A1 | 6/2008 | Aahlad et al. |
| 2008/0299944 A1* | 12/2008 | Cai ............. G06Q 10/063 |
| | | 455/406 |
| 2009/0116381 A1 | 5/2009 | Kanda |
| 2010/0271947 A1 | 10/2010 | Abdelal et al. |
| 2011/0047612 A1 | 2/2011 | D'ambrosio et al. |
| 2012/0115492 A1* | 5/2012 | Liao ................ H04W 8/30 |
| | | 455/445 |
| 2012/0309383 A1 | 12/2012 | Van Phan et al. |
| 2012/0323703 A1 | 12/2012 | Hillier |
| 2013/0322255 A1 | 12/2013 | Dillon |
| 2014/0188971 A1 | 7/2014 | Aahlad et al. |
| 2014/0189004 A1 | 7/2014 | Aahlad et al. |
| 2014/0235262 A1* | 8/2014 | Cho ............. H04W 28/0247 |
| | | 455/453 |
| 2016/0366061 A1* | 12/2016 | Renzullo ......... H04L 67/1002 |
| | | 370/328 |
| 2017/0019750 A1* | 1/2017 | Palanisamy ........ H04W 4/005 |
| | | 370/328 |
| 2017/0070895 A1* | 3/2017 | Zhang ............ H04W 24/02 |
| | | 370/328 |
| 2017/0163432 A1* | 6/2017 | Castro Castro ..... H04L 12/1407 |
| | | 370/328 |
| 2017/0353545 A1* | 12/2017 | Peles ............... H04L 47/10 |
| | | 370/328 |
| 2018/0063741 A1* | 3/2018 | Chou ............. H04W 28/16 |
| | | 370/328 |

FOREIGN PATENT DOCUMENTS

| | | |
|---|---|---|
| CN | 102567080 A | 7/2012 |
| CN | 103346924 A | 10/2013 |
| CN | 103986665 A | 8/2014 |
| CN | 103648088 B | 10/2016 |
| WO | WO-2007062573 A1 | 6/2007 |
| WO | WO-2014124558 A1 | 8/2014 |

* cited by examiner

ADAPTIVE PEER OVERLOAD CONTROL IN MOBILE NETWORKS

CROSS REFERENCE TO RELATED APPLICATIONS

This application claims priority to U.S. Provisional Application No. 62/273,734, titled "Adaptive Peer Overload Control in Mobile Networks," and filed on Dec. 31, 2015, which is incorporated herein by reference.

TECHNICAL FIELD

The present disclosure relates to adaptive control of transaction rates. More specifically, the present disclosure relates to systems and methods of adaptive peer overload control in mobile networks.

BACKGROUND

In mobile networks, a node can be overloaded when a peer node sends more transaction than the node can handle. Traditionally, in order not to bring down the network, mobile operators usually configure a very conservative/artificial maximum transaction rates on each node that interfaces with the server. Manual configuration can pose many challenges, including reconfiguration upon a change in the network.

SUMMARY

An aspect of the systems and methods described herein may include techniques for adaptively adjusting a transaction rate at a mobile network node. In some aspects, the systems and methods include receiving, at a first mobile network client node, configuration parameters including at least one of: an initial transaction rate, the initial transaction rate associated with an initial number of transactions per second being communicated by the first mobile network client node to a server node through a network at an initial time, a step up rate, the step up rate associated with a first number of transactions per second indicative of an increase in the initial transaction rate, a step down rate, the step down rate associated with a second number of transactions per second indicative of a decrease in the initial transaction rate, a minimum rate, a maximum rate, an evaluation time period, a step up response time threshold being associated with a response time indicative of increasing the initial transaction rate, a step down response time threshold being associated with a response time indicative of decreasing the initial transaction rate, a step up threshold percentage of responses associated with the step up response time threshold, and a step down threshold percentage of responses associated with the step down response time threshold. In some aspects, the systems and methods include receiving, at the first mobile network client node, responses associated with communications with the server node during a first time period associated with the evaluation time period. In some aspects, the systems and methods include determining, at the first mobile network client node, during the first time period, a percentage of the received responses being less than the step up response time threshold and a percentage of the received responses being greater than the step down response time threshold. In some aspects, the systems and methods include increasing, at the first mobile network client node, the initial transaction rate by the step up rate to form an increased rate when the percentage of the received responses being less than the step up response time threshold is greater than the step up threshold percentage of responses, and the increased rate is less than or equal to the maximum rate. In some aspects, the systems and methods include decreasing, at the first mobile network client node, the initial transaction rate by the step down rate to form a decreased rate when: the percentage of the received responses being greater than the step down response time threshold is greater than the step down threshold percentage of responses, and the decreased rate is greater than or equal to the minimum rate.

In some embodiments, the increased rate is associated with at least one of an upgrade to the server node, a change in a condition of the network, and a removal of a second mobile network client node in communication with the server node.

In some embodiments, the upgrade to the server node comprises at least one of: adding at least one CPU to the server node; adding memory to the server node; and adding at least one virtual machine to the server node.

In some embodiments, the decreased rate is associated with at least one of a downgrade to the server node, a change in a condition of the network and an addition of a second mobile network client node in communication with the server node.

In some embodiments, the downgrade to the server node comprises adding at least one of: removing at least one CPU to the server node; removing memory to the server node; and removing at least one virtual machine to the server node.

In some embodiments, the first mobile network client node comprises at least one of serving gateway (SGW), packet data network gateway (PGW), gateway GPRS support node (GGSN), mobility management entity (MME), serving GPRS support node (SGSN), and radio network controller (RNC). In some embodiments, the server node comprises at least one of policy and charging rules function (PCRF), online charging system (OCS), authorization and accounting server (AAA), home subscriber server (HSS), charging gateway function (CGF), offline charging system (OFCS).

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
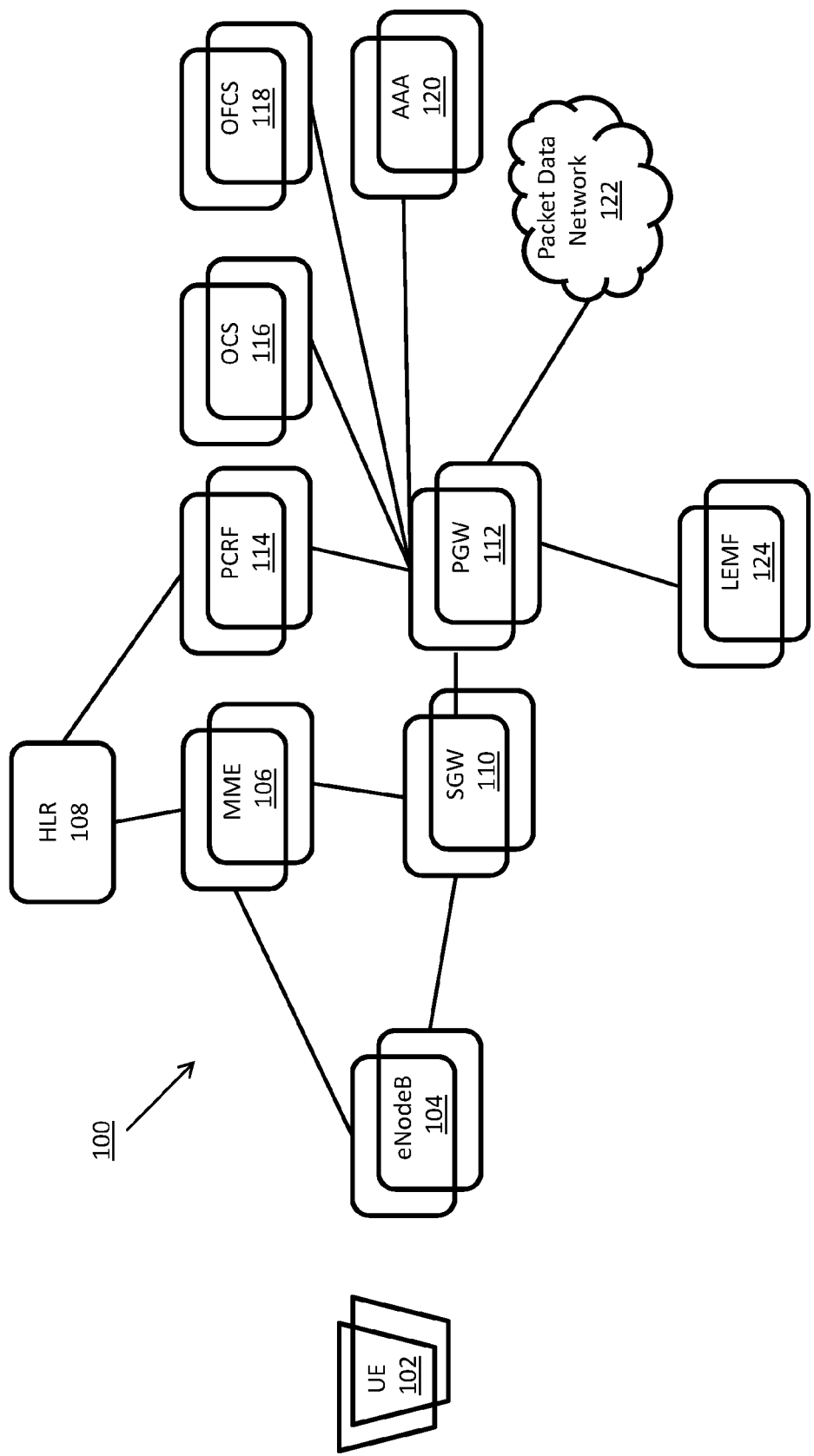
FIG. 1 is a system diagram showing different nodes in wireless operator networked system 100, according to some embodiments of the present disclosure.

In mobile operators networks, it can be important not to overload peer nodes (e.g., charging rules function (PCRF), online charging system (OCS), authorization and accounting server (AAA), home subscriber server (HSS), charging gateway function (CGF), offline charging system (OFCS)). Overloading a peer node can occur by sending more transactions than a node can handle, thus overwhelming a peer node. At times, a peer node can be catastrophically overloaded if the peer node is critical for operation (e.g., HSS/PCRF) of the network.

In networks can be difficult to predict upfront the optimal maximum transaction rate at which one Node (Node-A) can send to its peer Node (Node-X) because the rate at which Node-X handles the transactions depends on various factors. Most of these factors are very dynamic in nature and keep changing in a live network, for example: the Node-X hardware (#CPUs, CPU Speed, Memory, Cache, IO etc.), number of other Nodes (Node-B, Node-C, etc.) connected to it plus the rate at which these other nodes are sending transactions (dynamic), the number of CPU instructions software takes to process each transaction (dynamic), network congestion (dynamic). With manual configuration of network nodes, there exist at least the following problems:
1. Operator needs to somehow determine and provision the maximum transaction rate at which each client can send to server.
2. Whenever a new client is added (e.g., for capacity expansion) to the server then operator needs to determine the new maximum transaction rate each client (Node-A and Node-B) can send to server (Node-X) and provision accordingly.
3. Whenever the server is upgraded with new hardware, operator needs to again determine the new maximum transaction rate and provision on each client.
4. In operator network if clients can talk to multiple servers (primary/secondary or for load balancing) then for each client-server this maximum transaction rate needs to provisioned and they needs to adjusted whenever new client is added or server is changed, network condition changes.
5. To avoid network outage, operator is forced to use conservative number and this unnecessarily impacts end user experience (Dropping calls w/network busy) and this might lead to losing customers to their competitors.

There exists a need for a solution to determine how each client node or client network element (e.g., serving gateway (SGW), packet data network gateway (PGW), gateway GPRS support node (GGSN), mobility management entity (MME), serving GPRS support node (SGSN), and radio network controller (RNC) can dynamically determine the maximum transaction rate allowed to send to each of its peer nodes (also referred to herein as server nodes or server network elements) (e.g., PCRF, OCS, AAA, HSS, CGF, OFCS). The initiator of a transaction is referred to herein as a client network element and the receiver of a transaction is referred to herein as server network element. Many combinations of server-client pairs are possible, including one packet core element functioning as a server node to another packet core element.

FIG. 1 is a system diagram showing different nodes in wireless operator networked system 100, according to some embodiments of the present disclosure. System 100 includes multiple instances of user equipment (UE) 102, Evolved Universal Terrestrial Access Network (E-UTRAN) Node B (eNodeB) 104, Evolved Packet Core (EPC) Mobility Management Entity (MME) 106, Home Subscriber Server (HSS) 108, Serving Gateway (SGW) 110, Packet Data Network Gateway (PGW) 112, Policy and Charging Rules Function (PCRF) 114, Online Charging System (OCS) 116, Offline Charging System (OFCS) 118, Authentication Authorization and Accounting Server (AAA) 120, Packet Data Network 122, Law Enforcement Monitoring Facility (LEMF) 124, Serving GPRS Support Node (SGSN) 126, Gateway GPRS Support Node (GGSN) 128.

UE 102 is in communication with eNodeB 104 when in a 4G network coverage area and UE 102 is in communication with NodeB (not shown) when in a 2G/3G GSM network coverage area. UE 102 can be any device capable of communicating with network 100. For example, UE 102 can be a laptop, personal computer, cell phone, including a personal digital assistant (PDA), a smartphone, a machine to machine (M2M) device, and an Internet of Things (IOT) device. In Teir-1 wireless operator networks there can be 100's of millions of UEs 102 attaching to the network 100.

eNodeB 104 is a network-element in E-UTRAN architecture which communicates with multiple UE 102 over air interface, communicates to an MME 106 for control path messages and communicates to SGW 110 for user data path messages. Each eNodeB provides wireless service to a portion of a geographic coverage area and has limited capacity. In Teir-1 wireless operator networks there can be hundreds of thousands of eNodeBs to cover the whole country and to support capacity needs in a densely population area.

MME 106 is one of the key control-plane network-element in an E-UTRAN architecture which is responsible for authenticating UE 102 with HSS 108. MME 106 handles the session setup, session teardown, mobility, paging, and session management events. MME also selects SGW 110, PGW 112 network-elements for hosting UE 102 session. In Teir-1 wireless operator networks there can be tens of thousands of these nodes.

HSS 108 is a network-element with a central database that contains user and subscription related information. MME 106 communicates with HSS 108 for user authentication and for other subscription information.

SGW 110 is a network-element that routes and forwards user data packets, while also acting as the mobility anchor for the user plane during inter-eNodeB handovers. SGW 110 communicates with PGW 112 towards core side for both control and data traffic and on access side it communicates with MME 106 for control and eNodeB 104 for data traffic. In Teir-1 wireless operator networks there could be thousands of these nodes.

PGW 112 is a network-element that provides connectivity for UE 102 with external Packet data networks 122. A UE 102 may have simultaneous connectivity with more than one packet data networks 122. PGW 112 performs policy enforcement based on a policy received from PCRF 114, online charging with OCS 114, offline charging with OFCS 116, lawful intercept with LEMF 124, authentication, authorization and accounting with AAA 120=. Each PGW 112 can anchor millions of UEs 102 and in Teir-1 wireless operator networks there could be thousands of these nodes.

In an operator network there are multiple nodes (network-elements) and each node communicates with multiple instances of other nodes for processing transactions. This disclosure provides solutions for at least two problems:

1. When a client node (e.g., PGW 112) is sending transactions to server node (e.g., PCRF 114), it can be useful to determine, in some embodiments, the optimum transaction rate at which client node can send transactions to server node (and beyond) such that server node does not run into overload. Determining the optimum transaction rate can be challenging especially in a dynamic environment where multiple dynamic clients (e.g., clients with varying rates of transactions) communicate with a single server node. In addition, determining an optimum transaction rate can be challenging because each server node can handle different rates based on the hardware the server is running. For example, when a server runs in a virtualized world (ex: cloud) the hardware resources are dynamically allocated and released, and client transaction rates needs to be adjusted accordingly.
2. When Client node (e.g., PGW 112) can send a transaction to any Server node in a group of Server nodes (PCRF1, PCRF2, etc. 114), it can be useful, in some embodiments, to set the criteria a Client node uses for selecting a Server node in the server-group so that the transactions are load balanced across these group of Server nodes. Each Server node can be running with different hardware resources and these resources can be dynamically allocated or de-allocated (in VM or cloud environment) and so Server node capacity/performance numbers are different and can be dynamic. In addition, each Sever node can be talking to a different number of Client nodes and a particular Client node does not necessarily know the number of transactions other Client nodes are sending to a Server node. For example, when there are multiple servers in server-group and each of these servers can handle different transaction rates, when sending a transaction the client chooses a server from this server-group. In some embodiments, clients use a round robin algorithm for sending transactions across multiple servers, but when these servers have different processing powers then clients may need to use a weighted round robin algorithm. However, when a server is dynamically adding or removing processing power, an operator can modify a client side configuration. As described herein, a transaction response time of a server can be used for selecting a server for next transaction. If a server responds quickly then it's lightly loaded and can process more transactions.

Figure 2:
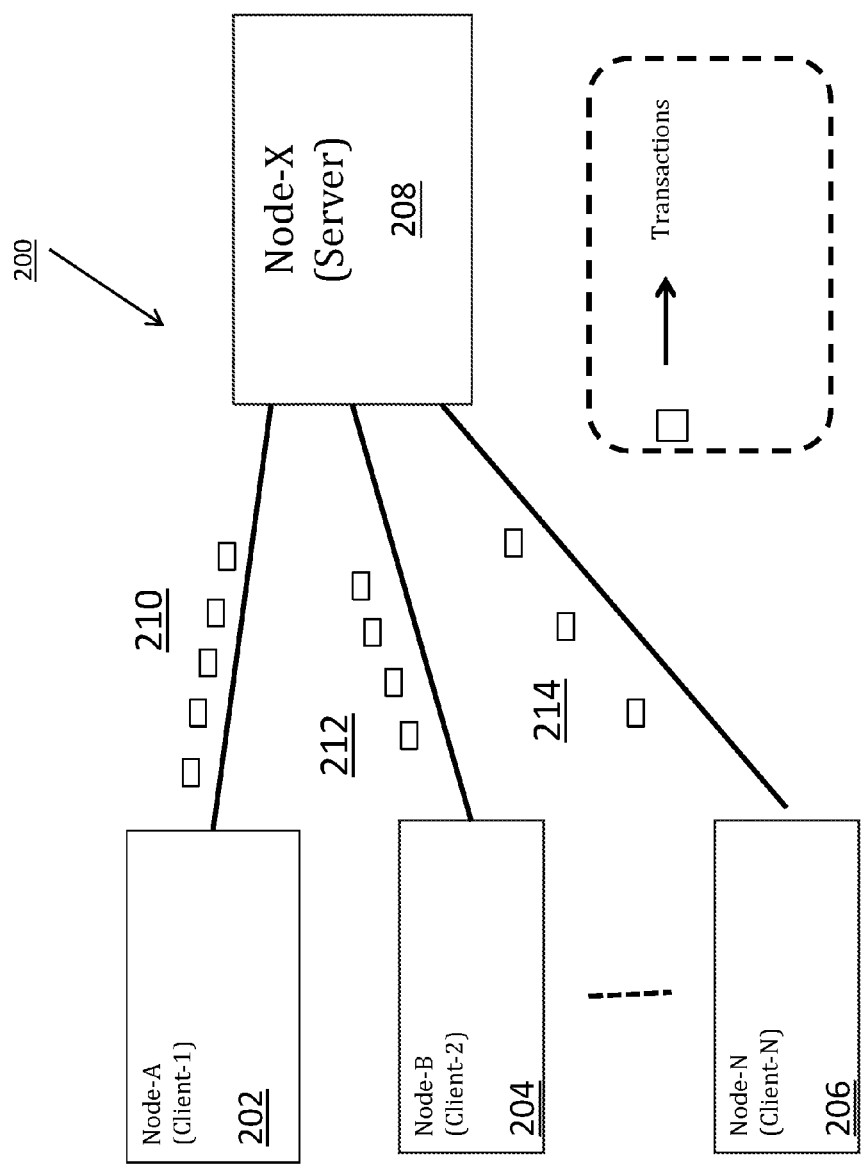
FIG. 2 is a system diagram showing client nodes and a server node in a networked system, according to some embodiments of the present disclosure.

FIG. 2 is a system diagram showing client nodes and a server node in a networked system, according to some embodiments of the present disclosure. FIG. 2 shows Client Node-A 202, Client Node-B 204, Client Node-N 206, Server Node-X 208, transactions between Client Node-A and Server Node-X 210, transactions between Client Node-B and Server Node-X 212, and transactions between Client Node-N and Server Node-X 214.

Client Node-A 202, Client Node-B 204, and Client Node-N 206 are clients to Server Node-X 208. In some embodiments, a client node requests for a service from server-node and the server node provides the service. For example, in FIG. 1 multiple PGW 112 instances talk to PCRF 114, each PGW 112 acts like a Client Node and PCRF 114 acts like a Server Node. Using this communication channel PGW 112 retrieves the UE 102 Policy information from PCRF 114 and enforces the policy. Another example is multiple PGW 112 instances talking to OCS 116 where each PGW 112 acts like a Client Node, where OCS 116 acts like a Server Node. Using this communication channel PGW 112 retrieves UE 102 Online usage credits from OCS 116 server node.

Each of Client Node-A 202, Client Node-B 204, and Client Node-N 206 can send a different rate of transactions 210, 212, and 214 to the server. For example, Client Node-A 202 can be handling dense populated downtown area generating higher transaction rate (transactions/second) 210 to Server Node-X 208, Client Node-B 204 can be handling moderate populated area generating moderate transaction rate 212 to Serve Node-X 208 and Client Node-C 206 can be handling lightly populated area generating lower transaction rate 214 to Server-Node X 208. Each of the Client Nodes 202, 204, and 206 can first send a request to the Server Node 208 to determine a maximum rate allowed for sending to the server. If all of the Client Nodes 202, 204, and 206 simultaneously send transactions to the Server Node 208 at a high rate, the Server Node 208 can become overwhelmed. For example, multiple PGW nodes talking to single PCRF server may overwhelm the PCRF server if all simultaneously send transactions to it at a high rate. This can happen during busy hour period or during software upgrade on these client nodes or some other events where lot of UEs tries to attach to the network at the same time.

In some embodiments, a server node can be a remote node in a Network Function Virtualization (NFV). A remote node can dynamically increase or decrease its processing capacity automatically without notifying the sending nodes. During these events, the nodes sending to the remote node may be configured in such a way that they may over or underwhelm the remote node. For example, consider a remote virtualized node that has determined it needs additional processing capacity and has asked for and received the additional capacity from the virtualized infrastructure. In its new state, the remote node is now capable of processing a higher number of transactions than it was. The sending nodes are unaware of the additional capacity and may be unnecessarily throttling their transactions towards the remote node thereby resulting in a reduction in service. Additionally, consider the case where a remote virtualized node has determined it does not need the capacity that it has been allocated and releases the virtual resources back to the virtualized infrastructure. In this case, without an adaptive peer overload solution the other nodes in the network may be configured in such a way so as to overwhelm the remote node that has scale back its resource consumption.

Figure 3:
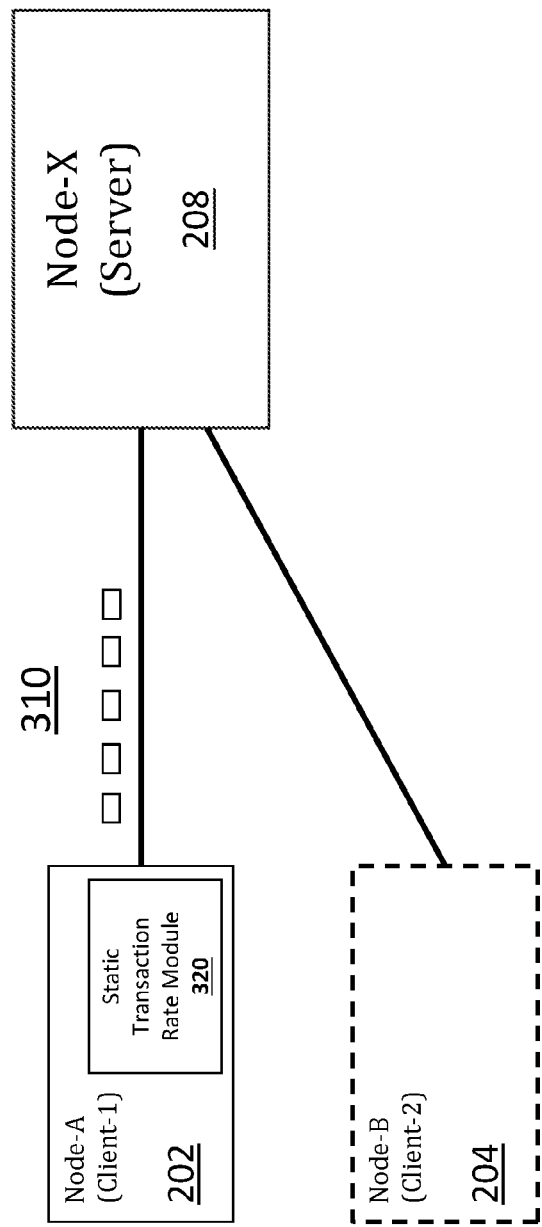
FIG. 3 is a system diagram showing an operator provisioned maximum transaction rate module in a client node.

FIG. 3 is a system diagram showing an operator provisioned maximum transaction rate module in a client node. FIG. 3 shows Client Node-A 202, Client Node-B 204, Server Node-X, transaction rate between Client Node-A and Server Node-X 310, and Static Maximum Transaction Rate Module 320. In this model operator configures upfront very conservative static maximum transaction rates on client side.

Typically static maximum transaction rates are configured on the client side for controlling the rate at which it can send to the server. In order to control the maximum transaction rate between the Client Node-A 202 and Server Node-X 208, mobile operators have to manually determine and provision a maximum transaction rate using a static maximum transaction rate module 320. In order not to bring down the network, mobile operators usually configure a very conservative/artificial maximum transaction rates on each client node (e.g., Client Node-A). Mobile operators also have to configure the maximum transaction rate each time a condition changes in the network. For example, whenever a new client (e.g., Node-B 204) is added (e.g., for capacity expansion) to the server then operator needs to determine the new maximum transaction rate each client (Node-A 202 and Node-B 204) can send to server (Node-X 208) and provision accordingly. As another example, whenever the server is upgraded with new hardware then operator needs to again determine the new maximum transaction rate and provision on each client. As a further example, if clients can talk to multiple servers (primary/secondary or for load balancing) then for each client-server, the maximum transaction rate needs to provisioned and needs to be adjusted whenever a new client is added, a server is changed, or network conditions change. To avoid network outage, an operator is forced to use a conservative maximum transaction rate, which unnecessarily impacts end user experience (e.g., dropping calls w/network busy) and might lead to losing customers to their competitors.

Instead of using a static, conservative maximum transaction rate, embodiments of the present disclosure describe making the maximum transaction rate adaptive based on various factors, including but not limited to: transaction response time, rate step-up thresholds and some hysteresis.

Figure 4:
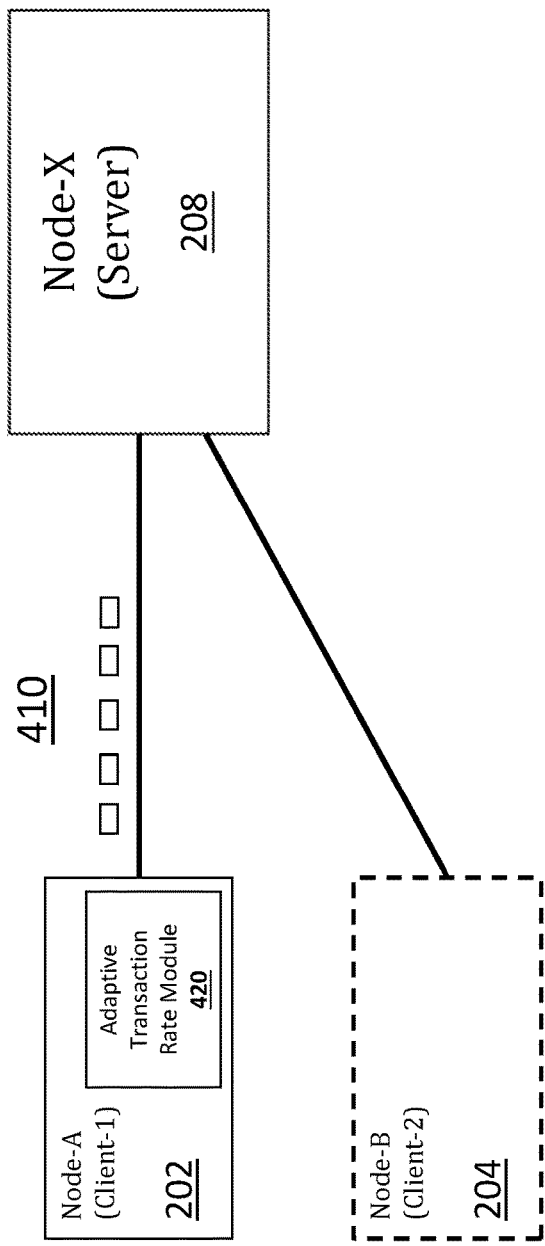
FIG. 4 is a system diagram showing an adaptive transaction rate module in a client node, according to some embodiments of the present disclosure.

FIG. 4 is a system diagram showing an adaptive transaction rate module in a client node, according to some embodiments of the present disclosure. FIG. 4 shows Client Node-A 202, Client Node-B 204, Server Node-X 208, maximum transaction rate between Client Node-A and Server Node-X 410, and adaptive transaction rate module 420.

Client Node-A 202 includes an adaptive transaction rate module 420. The adaptive transaction rate module 420 using an adaptive algorithm can automatically determine an optimal transaction rate using the transaction response time. In some embodiments, the adaptive transaction rate module 420 can automatically determine an optimal transaction rate using at least a portion of the following operator-provisioned attributes:

1. initial-rate
2. maximum-rate
3. minimum-rate
4. evaluation-time-period
5. step-up-rate
6. step-up-transaction-response-time-threshold
7. percentage-of-responses-received-within-step-up-threshold
8. step-down-rate
9. step-down-transaction-response-time-threshold
10. percentage-of-responses-exceeded-step-down-threshold In some embodiments, an algorithm can start at an initial rate and operator can set the initial rate to a reasonable value at which the Server can handle the transactions. In some embodiments maximum-rate can refer to a rate that an adaptive algorithm stops increasing beyond and a minimum-rate can refer to a rate that an adaptive algorithm stops decreasing below. Both the maximum-rate and the minimum-rate can be operator configured.

In some embodiments, evaluation-time-period refers to a period of time to wait before changing the rate. In some embodiments, step-up-rate refers to an incremental rate the adaptive algorithm will increase a transaction rate and a step-down rate refers to a decrement rate the adaptive algorithm will decrease a transaction rate. In some embodiments, step-up-transaction-response-time-threshold refers to a response time threshold, or responses that are received from the server within a certain time period, for counting the responses in a step-up bucket and a step-down-transaction-response-time-threshold refers to the response time threshold for counting the responses in step-down bucket. Step-up bucket refers to a number of transaction responses received within a step-up-transaction-response-time-threshold. Step-down bucket refers to a number of transaction responses received beyond step-down-transaction-response-time-threshold. In some embodiments, percentage-of-responses-received-within-step-up-threshold includes a percentage of responses that need to be received during an evaluation time period within step-up-transaction-response-time-threshold to increase the rate by a step-up-rate and percentage-of-responses-received-within-step-down-threshold refers to the percentage of responses that need to be received during an evaluation time period, within step-down-transaction-response-time-threshold to decrease the rate by a step-down-rate.

Even if an initial-rate is not set that accurately, over a period of time, adaptive transaction rate module 420 can automatically determine the optimal transaction rate and operate at that rate. The optimal transaction rate may vary over time. The position of adaptive transaction rate module 420 in a client node allows for the adaptive transaction rate module 420 to adapt to variations in processing performance of the remote node. The adaptive transaction rate module 420 can be deployed in any number or combinations of client nodes within a network. Particularly in cases where the remote note is a Virtual Network Function (VNF), there may be cases where the VNF has reached a threshold and has requested additional processing capacity from the virtualized infrastructure. This additional capacity may be in the form of an additional virtual CPU, virtual Memory, or additional virtual machines. During these times, the capacity of the remote node can change. At the completion of a scale out event of the remote node where additional VMs are added to the VNF, adaptive transaction rate module 420 provides for the transaction rates to increase proportionally.

Figure 5:
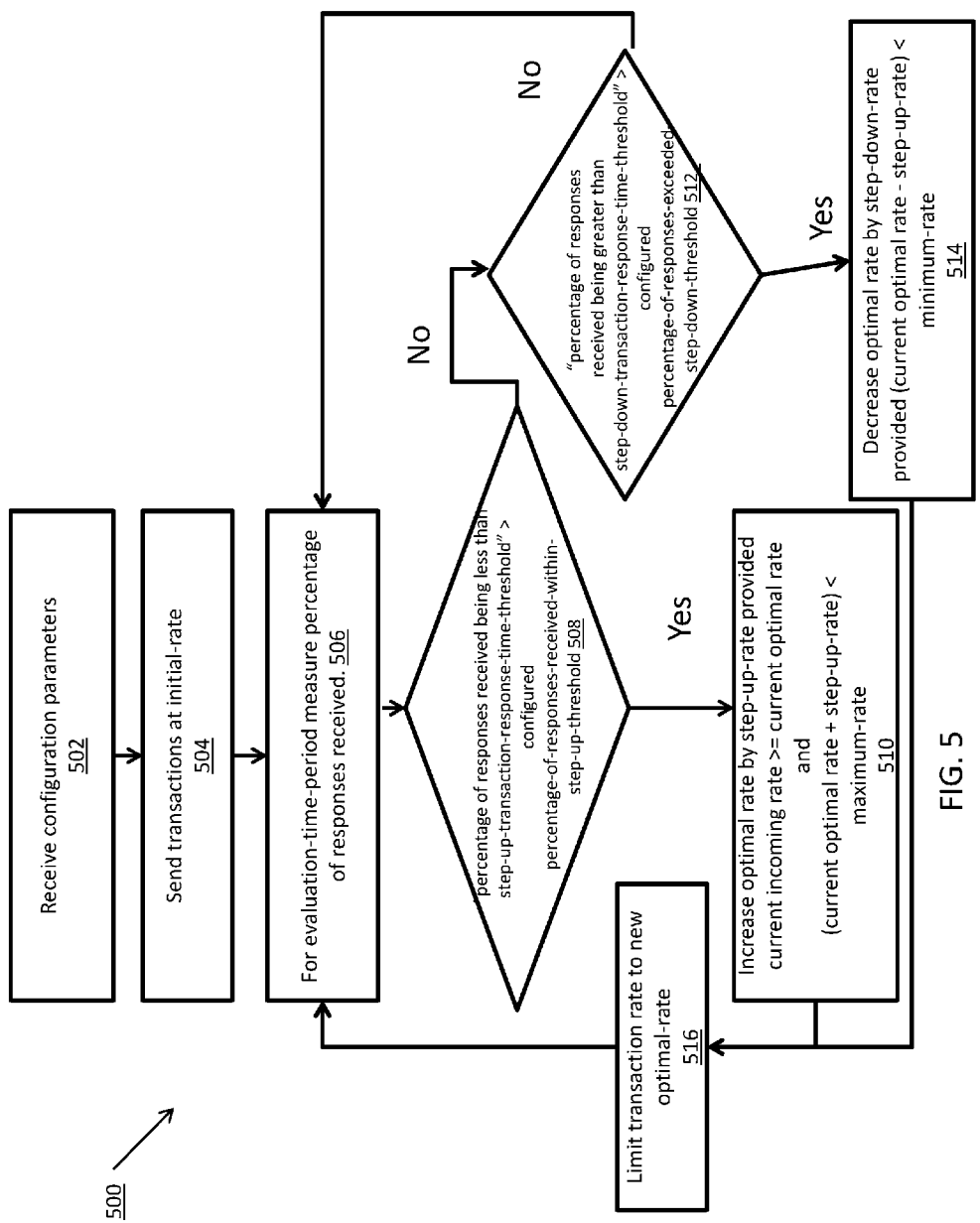
FIG. 5 is a computerized method for dynamically adjusting an optimal-rate based on transaction response time, according to some embodiments of the present disclosure.

FIG. 5 is a computerized method 500 for dynamically adjusting an optimal-rate based on transaction response time, according to some embodiments of the present disclosure. At step 502, receive configuration parameters. At step 504, set optimal-rate to configured initial-rate and send transaction at initial rate. At step 506, for configured evaluation-time-period, measure percentage of responses with response time less than configured step-up-transaction-response-time-threshold value and also measure percentage of responses with response time greater than step-down-transaction-response-time-threshold value. At step 508, check if computed "percentage of responses received within step-up-transaction-response-time-threshold">percentage-of-responses-received-within-step-up-threshold. At step 510, if the answer to step 508 is "Yes" and incoming-rate>=optimum-rate then increase optimum-rate by step-up-rate if (optimal-rate+step-up-rate)<maximum-rate else set optimal-rate with maximum-rate. At step 512, if the answer to step 508 is "No" now check if computed "percentage of responses received exceeded step-down-transaction-response-time-threshold">percentage-of-responses-exceeded-step-down-threshold. At step 514, if the answer to step 512 is "Yes" decrease optimal-rate by step-down-rate if (optimum-rate−step-down-rate)>minimum-rate else set optimal-rate with minimum-rate. At step 516, limit number of transactions to new optimal-rate and repeat the steps 506 to 512 and continuously adjust the optimum-rate.

Referring to step 502, the configuration parameters can include the parameters as discussed above. Briefly, configuration parameters can include the following:

1. initial-rate,
2. maximum-rate
3. minimum-rate 4. evaluation-time-period
5. step-up-rate
6. step-up-transaction-response-time-threshold
7. percentage-of-responses-received-within-step-up-threshold
8. step-down-rate
9. step-down-transaction-response-time-threshold
10. percentage-of-responses-exceeded-step-down-threshold Referring to step 504, the adaptive algorithm associated with the adaptive transaction rate module 420 starts at an optimal-rate with operator-provisioned initial-rate and limits the outgoing transaction rate to this optimal-rate. If the incoming transaction rate is higher than outgoing transaction rate then the excess transactions can be intelligently dropped (ex: drop lower priority transaction) or store temporarily assuming the optimal-rate increases over time.

Referring to step 506, for evaluation-time-period, the adaptive transaction rate module 420 measures the response time for each transaction and measures percentage of transaction responses received within step-up-transaction-response-time-threshold. The adaptive transaction rate module 420 also measures a percentage of transaction responses received that exceed the step-down-transaction-response-time-threshold.

Referring to step 508, adaptive transaction rate module 420 checks if percentage of transaction responses received within step-up-transaction-response-time-period is greater than percentage-of-responses-received-within-step-up-threshold.

Referring to step 510, if the answer to step 508 is "Yes" and if incoming-rate is greater or equal to current-rate, then the current operating optimal-rate is increased by step-up-rate amount provided the new rate is less than maximum-rate else set to maximum allowed rate.

Referring to step 512, if the answer to step 508 is "No" then check if "percentage of transaction responses received exceeded step-down-transaction-response-time-period" is greater than percentage-of-responses-exceeded-step-down-threshold.

Referring to step 514, if the answer to step 512 is "Yes" then the current operating optimal-rate is decreased by step-down-rate amount provided the new optimal-rate is greater than minimum-rate else set the optimal-rate to minimum-rate.

Referring to step 516, algorithm uses the new optimal-rate to limit the processing of incoming transactions.

Steps 506 to 516 is repeated every evaluation-time-period and dynamically adjusts the optimal-rate.

Referring to FIG. 5, if a server node is lightly loaded then it processes transactions and responds at faster rate. Client node can increase the transaction rate in response, provided client node has more transactions to offer than the current optimal-rate. On the other hand, if server node is getting overloaded then it takes a longer time to process and respond to the transactions. This triggers Client node to reduce the transaction rate in response. This is how the system automatically adjusts and operates in optimal-transaction-rate.

For example, suppose an operator configured:
initial_rate=1000,
maximum-rate=20000,
minimum-rate=100
evaluation-time-period=5 seconds
step_up_rate=100,
step-up-transaction-response-time-threshold=1000 milliseconds
percentage-of-responses-received-within-step-up-threshold=98,
step_down_rate=200,
step-down-transaction-response-time-threshold=1500 milliseconds,
percentage-of-responses-exceeded-step-down-threshold=5, Suppose Server node can handle ~5,000 transactions per second (sends responses within 1000 milliseconds) and with the above configuration the client starts at 1000 transactions per second (initial_rate) and if 98% (percentage-of-responses-received-within-step-up-threshold) of responses comes within 1000 milliseconds (step-up-transaction-response-time-threshold) for next 5 seconds (evaluation-time-period) then the rate is increased by additional 100 (step_up_rate) and this process repeats every 5 seconds (evaluation-time-period) and the rate ramp ups to 5,000 transactions per second in 200 seconds. The rate is increased until the 98% of responses come within 1000 milliseconds. Later, suppose the operator adds more capacity (VM scale out) on server side and now, say, it can now handle 6,000 transactions per second then client starts seeing more than 98% of responses come within 1000 milliseconds and so starts increasing the rate again and reaches 6,000 transactions per second in next 50 seconds and operates at that rate. Now, suppose the operator reduces the server capacity (ex: VM scale in or partial server failure) and because of this say it now can handle only 5,000 transactions per second. Client starts seeing longer transaction responses and if more than 5% (percentage-of-responses-exceeded-step-down-threshold-in-last-second) responses are greater than 1500 milliseconds then the rate is reduced by 200 (step_down_rate) and within 25 seconds the rate goes down to 5000 transactions/second. And if the server is completely down then with in another 125 seconds the rate goes down to minimum_rate (100 transaction per second).

In embodiments of the present disclosure, if any network/server operating condition changes then the client automatically either ramp-up or ramp-down the rate and operates in the optimal rate. The algorithm above is simple linear ramp-up and ramp-down function based on response time but if operator prefers different ramp-up and ramp-down function (ex: logarithmic or exponential) then this can be enhanced easily.

In some embodiments of the present disclosure, systems and methods are described for adaptively adjusting a transaction rate at a mobile network node. In some embodiments, the systems and methods described herein include receiving, at a first mobile network client node, configuration parameters associated with at least one of an initial transaction rate, a step up rate, a step down rate, an evaluation time period, a step up response time threshold, a step down response time threshold, a percentage of responses received within the step up threshold, and a percentage of responses received within the step down threshold. In some embodiments the systems and methods described herein include receiving, at the first mobile network client node, responses associated with communications with a server node. In some embodiments, the systems and methods described herein include determining, at the first mobile network client node, a percentage of received responses being less than the step up response time threshold and a percentage of received responses being greater than the step down response time threshold. In some embodiments, the systems and methods described herein include increasing, at the first mobile network client node, the initial transaction rate by the step up rate when the percentage of received responses being less than the step up response time threshold is greater than the percentage of responses received within the step up threshold during the evaluation time period. In some embodiments, the systems and methods described herein include decreasing, at the first mobile network client node, the initial transaction rate by the step down rate when the percentage of received responses being greater than the step down response time threshold is greater than the percentage of responses received within the step down threshold during the evaluation time period.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method for adaptively adjusting a transaction rate at a mobile network node, the computerized method comprising:
 receiving, at a first mobile network client node, configuration parameters including at least one of:
  an initial transaction rate, the initial transaction rate associated with an initial number of transactions per second being communicated by the first mobile network client node to a server node through a network at an initial time,
  a step up rate, the step up rate associated with a first number of transactions per second indicative of an increase in the initial transaction rate, a step down rate, the step down rate associated with a second number of transactions per second indicative of a decrease in the initial transaction rate,
a minimum rate,
a maximum rate,
an evaluation time period,
a step up response time threshold being associated with a response time indicative of increasing the initial transaction rate,
a step down response time threshold being associated with a response time indicative of decreasing the initial transaction rate,
a step up threshold percentage of responses associated with the step up response time threshold, and
a step down threshold percentage of responses associated with the step down response time threshold;
receiving, at the first mobile network client node, responses associated with communications with the server node during a first time period associated with the evaluation time period;
determining, at the first mobile network client node, during the first time period, a percentage of the received responses being less than the step up response time threshold and a percentage of the received responses being greater than the step down response time threshold;
increasing, at the first mobile network client node, the initial transaction rate by the step up rate to form an increased rate when:
the percentage of the received responses being less than the step up response time threshold is greater than the step up threshold percentage of responses, and
the increased rate is less than or equal to the maximum rate; and
decreasing, at the first mobile network client node, the initial transaction rate by the step down rate to form a decreased rate when:
the percentage of the received responses being greater than the step down response time threshold is greater than the step down threshold percentage of responses, and
the decreased rate is greater than or equal to the minimum rate.

2. The method of claim 1, wherein the increased rate is associated with at least one of an upgrade to the server node, a change in a condition of the network, and a removal of a second mobile network client node in communication with the server node.

3. The method of claim 2, wherein the upgrade to the server node comprises at least one of:
adding at least one CPU to the server node;
adding memory to the server node; and
adding at least one virtual machine to the server node.

4. The method of claim 1, wherein the decreased rate is associated with at least one of a downgrade to the server node, a change in a condition of the network and an addition of a second mobile network client node in communication with the server node.

5. The method of claim 4, wherein the downgrade to the server node comprises at least one of:
removing at least one CPU to the server node;
removing memory to the server node; and
removing at least one virtual machine to the server node.

6. The method of claim 1, wherein the first mobile network client node comprises at least one of serving gateway (SGW), packet data network gateway (PGW), gateway GPRS support node (GGSN), mobility management entity (MME), serving GPRS support node (SGSN), and radio network controller (RNC).

7. The method of claim 1, wherein the server node comprises at least one of policy and charging rules function (PCRF), online charging system (OCS), authorization and accounting server (AAA), home subscriber server (HSS), charging gateway function (CGF), offline charging system (OFCS).

8. A computing device for adaptively adjusting a transaction rate at a mobile network node, the computing device comprising:
a memory; and
a processor in communication with the memory, and configured to run a module stored in memory that is configured to cause the processor to:
receive configuration parameters including at least one of:
an initial transaction rate, the initial transaction rate associated with an initial number of transactions per second being communicated by a first mobile network client node to a server node through a network at an initial time,
a step up rate, the step up rate associated with a first number of transactions per second indicative of an increase in the initial transaction rate,
a step down rate, the step down rate associated with a second number of transactions per second indicative of a decrease in the initial transaction rate,
a minimum rate,
a maximum rate,
an evaluation time period,
a step up response time threshold being associated with a response time indicative of increasing the initial transaction rate,
a step down response time threshold being associated with a response time indicative of decreasing the initial transaction rate,
a step up threshold percentage of responses associated with the step up response time threshold, and
a step down threshold percentage of responses associated with the step down response time threshold;
receive responses associated with communications with the server node during a first time period associated with the evaluation time period;
determine during the first time period, a percentage of the received responses being less than the step up response time threshold and a percentage of the received responses being greater than the step down response time threshold;
increase the initial transaction rate by the step up rate to form an increased rate when:
the percentage of the received responses being less than the step up response time threshold is greater than the step up threshold percentage of responses, and
the increased rate is less than or equal to the maximum rate; and
decrease the initial transaction rate by the step down rate to form a decreased rate when:
the percentage of the received responses being greater than the step down response time threshold is greater than the step down threshold percentage of responses, and
the decreased rate is greater than or equal to the minimum rate.

9. The computing device of claim 8, wherein the increased rate is associated with at least one of an upgrade to the server node, a change in a condition of the network, and a removal of a second mobile network client node in communication with the server node.

10. The computing device of claim 9, wherein the upgrade to the server node comprises at least one of:
adding at least one CPU to the server node;
adding memory to the server node; and
adding at least one virtual machine to the server node.

11. The computing device of claim 8, wherein the decreased rate is associated with at least one of a downgrade to the server node, a change in a condition of the network and an addition of a second mobile network client node in communication with the server node.

12. The computing device of claim 11, wherein the downgrade to the server node comprises at least one of:
removing at least one CPU to the server node;
removing memory to the server node; and
removing at least one virtual machine to the server node.

13. The computing device of claim 8, wherein the first mobile network client node comprises at least one of serving gateway (SGW), packet data network gateway (PGW), gateway GPRS support node (GGSN), mobility management entity (MME), serving GPRS support node (SGSN), and radio network controller (RNC).

14. The computing device of claim 8, wherein the server node comprises at least one of policy and charging rules function (PCRF), online charging system (OCS), authorization and accounting server (AAA), home subscriber server (HSS), charging gateway function (CGF), offline charging system (OFCS).

15. A non-transitory computer readable medium having executable instructions operable to cause an apparatus to:
receive configuration parameters including at least one of:
an initial transaction rate, the initial transaction rate associated with an initial number of transactions per second being communicated by a first mobile network client node to a server node through a network at an initial time,
a step up rate, the step up rate associated with a first number of transactions per second indicative of an increase in the initial transaction rate,
a step down rate, the step down rate associated with a second number of transactions per second indicative of a decrease in the initial transaction rate,
a minimum rate,
a maximum rate,
an evaluation time period,
a step up response time threshold being associated with a response time indicative of increasing the initial transaction rate,
a step down response time threshold being associated with a response time indicative of decreasing the initial transaction rate,
a step up threshold percentage of responses associated with the step up response time threshold, and
a step down threshold percentage of responses associated with the step down response time threshold;
receive responses associated with communications with the server node during a first time period associated with the evaluation time period;
determine during the first time period, a percentage of the received responses being less than the step up response time threshold and a percentage of the received responses being greater than the step down response time threshold;
increase the initial transaction rate by the step up rate to form an increased rate when:
the percentage of the received responses being less than the step up response time threshold is greater than the step up threshold percentage of responses, and
the increased rate is less than or equal to the maximum rate; and
decrease the initial transaction rate by the step down rate to form a decreased rate when:
the percentage of the received responses being greater than the step down response time threshold is greater than the step down threshold percentage of responses, and
the decreased rate is greater than or equal to the minimum rate.

16. The non-transitory computer readable medium of claim 15, wherein the increased rate is associated with at least one of an upgrade to the server node, a change in a condition of the network, and a removal of a second mobile network client node in communication with the server node.

17. The non-transitory computer readable medium of claim 16, wherein the upgrade to the server node comprises at least one of:
adding at least one CPU to the server node;
adding memory to the server node; and
adding at least one virtual machine to the server node.

18. The non-transitory computer readable medium of claim 15, wherein the decreased rate is associated with at least one of a downgrade to the server node, a change in a condition of the network and an addition of a second mobile network client node in communication with the server node.

19. The non-transitory computer readable medium of claim 18, wherein the downgrade to the server node comprises at least one of:
removing at least one CPU to the server node;
removing memory to the server node; and
removing at least one virtual machine to the server node.

20. The non-transitory computer readable medium of claim 15, wherein the first mobile network client node comprises at least one of serving gateway (SGW), packet data network gateway (PGW), gateway GPRS support node (GGSN), mobility management entity (MME), serving GPRS support node (SGSN), and radio network controller (RNC), and wherein the server node comprises at least one of policy and charging rules function (PCRF), online charging system (OCS), authorization and accounting server (AAA), home subscriber server (HSS), charging gateway function (CGF), offline charging system (OFCS).

* * * * *

UNITED STATES PATENT AND TRADEMARK OFFICE
CERTIFICATE OF CORRECTION

PATENT NO. : 10,129,769 B2
APPLICATION NO. : 15/389588
DATED : November 13, 2018
INVENTOR(S) : James J. Logan et al.

It is certified that error appears in the above-identified patent and that said Letters Patent is hereby corrected as shown below:

On the Title Page

Item [72], should read:
James J. Logan, Acton, MA (US)
Mark Libby, Groton, MA (US)
Narsi Veldanda, Northboro, MA (US)
Rajesh Palakkal, Groton, MA (US)
Siddharth Bhojnagarwala, Concord, MA (US)

Signed and Sealed this
Ninth Day of June, 2020

Andrei Iancu
*Director of the United States Patent and Trademark Office*